No. 788,754.       Patented May 2, 1905.

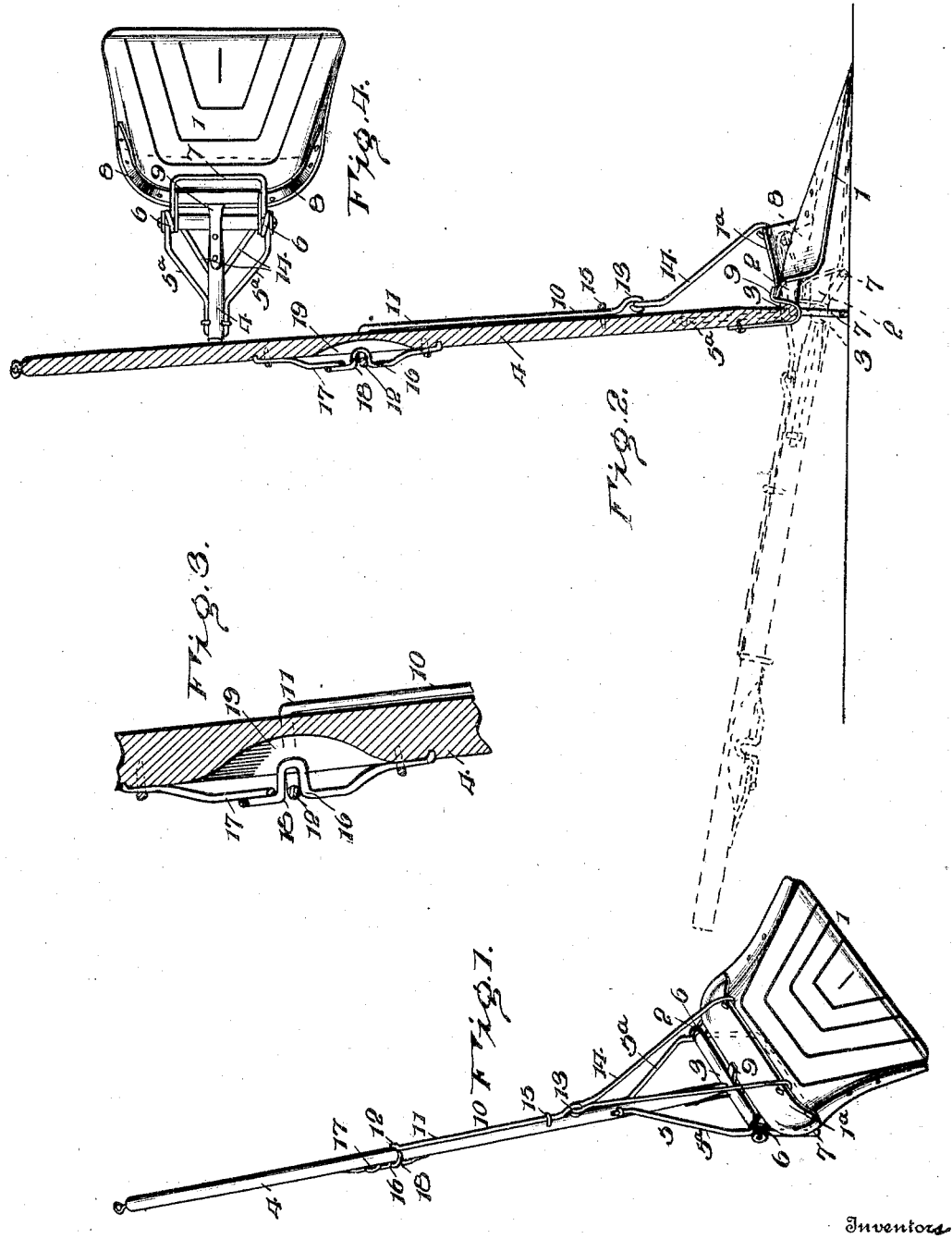

UNITED STATES PATENT OFFICE.

SPENCER J. CORNER, OF BURCHARD, AND LOUISE CORNER, OF STELLA, NEBRASKA.

DUST-PAN.

SPECIFICATION forming part of Letters Patent No. 788,754, dated May 2, 1905.

Application filed June 11, 1904. Serial No. 212,142.

*To all whom it may concern:*

Be it known that we, SPENCER J. CORNER, residing at Burchard, in the county of Pawnee, and LOUISE CORNER, residing at Stella, in the county of Richardson, State of Nebraska, citizens of the United States, have invented certain new and useful Improvements in Dust-Pans, of which the following is a specification.

This invention relates to pans into which dust and sweepings are brushed for convenience of collection and conveyance to the receptacle, pile, or other place of deposit for refuse matter.

The purpose of the invention is to provide a dust-pan having a folding handle which can be turned into an upright position, so as to avoid stooping or bending, which is objectionable and oftentimes hurtful to the housewife, with novel adjuncts for holding the handle in either of its extreme positions, whereby the pan can be carried and manipulated by means of the handle whether it is vertical or horizontal.

The invention also has for its object to combine with the pan a rigid foot-piece to admit of the sweepings being conveniently and advantageously brushed into the pan, said foot-piece being adapted to lie in the plane of the pan, so as not to be in the way and admit of the pan occupying the smallest amount of space possible.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of a dust-pan embodying the invention. Fig. 2 is a sectional view showing the handle turned upward in full lines and extended horizontal in dotted lines. Fig. 3 is a longitudinal section of a portion of the handle and the runner, showing the catch coöperating therewith. Fig. 4 is a bottom plan view.

Corresponding and like parts are referred to in the following description and indicated in all the views of the drawings by the same reference characters.

The pan 1 is of ordinary construction, and its rear is closed by a guard $1^a$ to prevent the brushing of dust thereover when taking up sweepings. Ears 2 project in the rear of the pan, and pivotally supported in the ears is a cross-bar 3, to which the handle 4 is centrally attached in any substantial manner. A brace 5 connects the handle and the cross-bar, and this brace comprises the side arms $5^a$, attached at their upper portions to the handle and projected outwardly and downwardly and secured to the ends of the cross-bar aforesaid. The arms $5^a$ of the brace 5 are peculiarly attached to the cross-bar, being formed with loops 6, secured to the ends of the cross-bar, each of the arms being projected downwardly from its loops 6 to form the foot-rest 7. The lower ends of the arms $5^a$ are connected, as shown in the drawings, to increase the substantiality of the foot-rest aforesaid. The ears 2 of the pan may be provided in any economic manner, and preferably consist of right-angularly bent ends of strips 8, which are applied to the rear portions of the pan, said strips 8 extending some distance along the sides thereof, thus reinforcing the body of the receptacle, so as to brace the same.

The cross-bar 3 may be of any form and, as shown, consists of a roller journaled to the ears 2, and any substantial means, such as screws or pivot-fastenings, may be utilized to secure the ends of the cross-bar to the ears aforesaid.

In order to normally hold the handle and the pan in alinement, a flat spring 9 is utilized, said spring being secured at one end to the rear portion of the lower extremity of the handle 4, the opposite end of the spring being bent beneath the cross-bar 3 and thence upwardly into engagement with the rear of the pan 1, so as to accomplish the result above mentioned. The normal tension of the spring 9 is such as to tend to force the pan into the alined position as regards the handle 4, as above premised.

Mounted upon the handle for longitudinal movement is disposed a runner 10, and this runner consists of a bar 11, formed at its upper end with a loop 12, which receives the handle, and at its lower end with an eye 13, the latter receiving the upper portion of a bail 14. The bail 14 is of a suitable substantial form, being pivotally connected with the runner at its upper end, the lower portions of the bail having pivotal connection with the pan, being attached to the guard 1ª thereof. In order to guide the lower end of the bar 11 in its longitudinal movement, the guide member 15 is utilized, and said member preferably consists of a staple through which the lower portion of the bar passes.

A catch 16 is provided for coöperation with the runner to hold the same at an ascertained adjustment, so as to hold the pan in a position approximately at a right angle to the handle when the said pan is resting upon the floor preparatory to receiving the sweepings. The catch 16 consists of a spring secured to the portion of the handle between the ends thereof, and this spring is preferably made of spring-wire or the like. The wire from which the catch 16 is made is coiled to form a finger-piece 17 and is deflected, as shown at 18, to form a seat within which the loop 12 of the runner 10 may be received and held from longitudinal movement. The seat 18 of the spring 16 is received in a recess 19 in the handle and has a limited movement within the recess, so as to admit of disengagement and engagement of the catch with the loop 12.

When it is required to manipulate the pan from an erect position, the lower end thereof is brought into contact with the floor or surface and the handle is pressed in a direction to lower the rear end thereof and bring the pan into an approximately horizontal position substantially parallel with the floor or surface upon which same is resting. The pressure is continued until the seat 18 of the catch 16 receives the loop 12 of the runner 10, when the engaging coöperation of said loop and catch will hold the handle in an upright position, as shown in full lines in Fig. 2. When the handle is in an upright position, the foot-piece 7, which forms a rigid portion of the brace 5, will rest upon the floor and properly support the pan, so that same may be shifted along the floor or surface to receive the sweepings, which can be readily and conveniently brushed therein. After the pan has been carried to the desired place for depositing the sweepings a slight pressure upon the finger-piece 17 of the catch 16 will release the runner and the spring 9 will force the pan into a line with the handle and dump the sweepings into the receptacle or place of deposit for refuse matter.

Having thus described the invention, what is claimed as new is—

1. The combination of a dust-pan, a cross-bar, a handle projected from the cross-bar, a brace comprising side arms provided with loops receiving the ends of the cross-bar and attached at their upper ends to the handle, the side arms of the brace being projected downward from the cross-bar to form a foot-rest, a flat spring secured to the handle and extended beneath the cross-bar into engagement with the pan, said spring normally tending to hold the pan and the handle in alinement, a runner mounted upon the handle, and a bail connecting the runner and the pan.

2. In combination with a dust-pan, a cross-bar disposed in rear of said pan, a handle projecting from the cross-bar, a brace comprising side arms provided with loops receiving the ends of the cross-bar and attached at their upper ends to the handle, the side arms of the brace being projected downwardly from the loops to form a foot-rest.

In testimony whereof we affix our signatures in presence of two witnesses.

SPENCER J. CORNER. [L. S.]
  LOUISE CORNER. [L. S.]

Witnesses for S. J. Corner's signature:
 FRED. W. WENTZ,
 GENEVA HART.

Witnesses for L. Corner's signature:
 E. W. JEFFRES,
 S. H. JOHNSON.